Aug. 26, 1958   O. R. WADE   2,849,710
MECHANICAL SCANNER AND CAM TRANSMISSION THEREFOR
Filed Aug. 16, 1955   5 Sheets-Sheet 1

FIG_1_

FIG_2_

OMER R. WADE
INVENTOR.

BY
ATTORNEYS

Aug. 26, 1958  O. R. WADE  2,849,710
MECHANICAL SCANNER AND CAM TRANSMISSION THEREFOR
Filed Aug. 16, 1955  5 Sheets-Sheet 2

FIG_3_

FIG_4_

FIG_5_

FIG_6_

OMER R. WADE
INVENTOR.

BY
ATTORNEYS

Aug. 26, 1958     O. R. WADE     2,849,710
MECHANICAL SCANNER AND CAM TRANSMISSION THEREFOR
Filed Aug. 16, 1955     5 Sheets-Sheet 3

FIG. 7     FIG. 10

OMER R. WADE
INVENTOR.

BY
ATTORNEYS

Aug. 26, 1958     O. R. WADE     2,849,710
MECHANICAL SCANNER AND CAM TRANSMISSION THEREFOR
Filed Aug. 16, 1955     5 Sheets-Sheet 5

FIG_9_

FIG_11_

FIG_12_

OMER R. WADE
INVENTOR.

BY
ATTORNEYS

United States Patent Office 2,849,710
Patented Aug. 26, 1958

2,849,710

MECHANICAL SCANNER AND CAM TRANSMISSION THEREFOR

Omer R. Wade, Menlo Park, Calif.

Application August 16, 1955, Serial No. 528,767

19 Claims. (Cl. 343—763)

This invention relates generally to mechanical scanners, and more particularly to mechanical scanners of the type which employ a selective cam transmission for controlling the movement of the antena.

In mechanical scanners it is desirable to provide a simple control whereby the nodding and/or tilting applied to the antenna can be started or stopped, as desired. Prior transmissions which have been available have not been subject to control in an easy and convenient manner, or have been unduly complicated in this respect. Further, satisfactory cam transmissions of the multi-cam type have not been available, particularly where it is desirable to provide for selective shifting from one type of movement to another, without stopping the driving member, with smooth transition between the several movements.

In general it is an object of the present invention to provide a novel mechanical scanner in which the beam scan may be easily controlled.

It is a further object of the invention to provide a mechanical scanner having a novel transmission of the cam type for controlling beam scan.

It is a further object of the invention to provide a mechanical scanner having a transmission of the multi-cam type with improved means for selective shifting from one type of movement to another for controlling scanning of the beam.

It is a further object of the invention to provide a mechanical scanner with a novel transmission of the aforementioned character wherein the selective shifting for desired scanning patterns is accomplished without discontinuity of cam motion and without mechanical disconnection of the transmission and the antenna.

It is a further object of the present invention to provide a mechanical scanner in which the scanning action may be controlled by means of an improved cam transmission of the aforementioned character whereby maximum target detection probability may be readily achieved.

It is still a further object of the present invention to provide a novel transmission of the cam type having improved means for controlling movement applied to a driven member.

It is still a further object of my invention to provide a transmission of the multi-cam type wherein selective shifting for desired integral patterns of movement to an external device is accomplished without discontinuity of cam motion or without mechanical disconnection of the transmission and the actuated or driven device.

It is another object of the invention to provide an improved selective cam transmission where intrinsic parts are movable relative to one another with simplicity and without undue wear thereby affording longevity of use and inexpensive maintenance.

Other objects of the invention, together with some of the advantageous features thereof, will appear from the following description of the preferred embodiment of the invention which is illustrated in the accompanying drawing. It is to be understood, however, that I am not to be limited to the precise embodiment shown, nor to the precise arrangement of various parts thereof, as my invention as defined in the appended claims can be embodied in a plurality and variety of forms.

Referring to the drawings.

In general, the mechanical scanner of my invention employs one or more transmissions of the cam type to impart desired cyclic motion to the antenna to make the beam scan in a predetermined manner. The transmission or transmissions may be selected to give any desired scan of a simple or complex type. Thus, scanning of the spiral, cone or horizontal type may be easily achieved. The novel cam transmission is such that it may be easily shifted from one type of scanning to another without stopping the driver and without disconnecting the antenna.

In order to more clearly understand the operation of the mechanical scanners shown in Figures 7–12, the novel cam transmission which is employed to control movement of the antenna will first be described in detail. Then various embodiments of mechanical scanners will be described.

In general, the transmission employs cam means for securing a predetermined pattern of movement of a driven member, together with means which are adapted to be positioned to secure a desired pattern.

For simplicity of description, the selective cam transmission has been illustrated in cylindrical form. It is to be understood, of course, that the transmission may be in planar sheet form or any other suitable shape.

Figure 1:
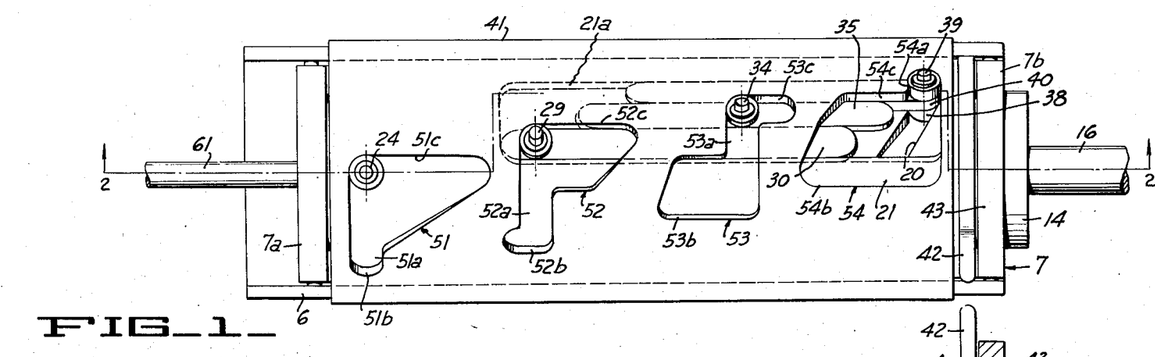
Figure 1 is a plan view of one embodiment of the selective transmission, a part thereof being cut away to show the construction, and dotted lines indicating the path of movement of certain parts thereof.
Figure 2:
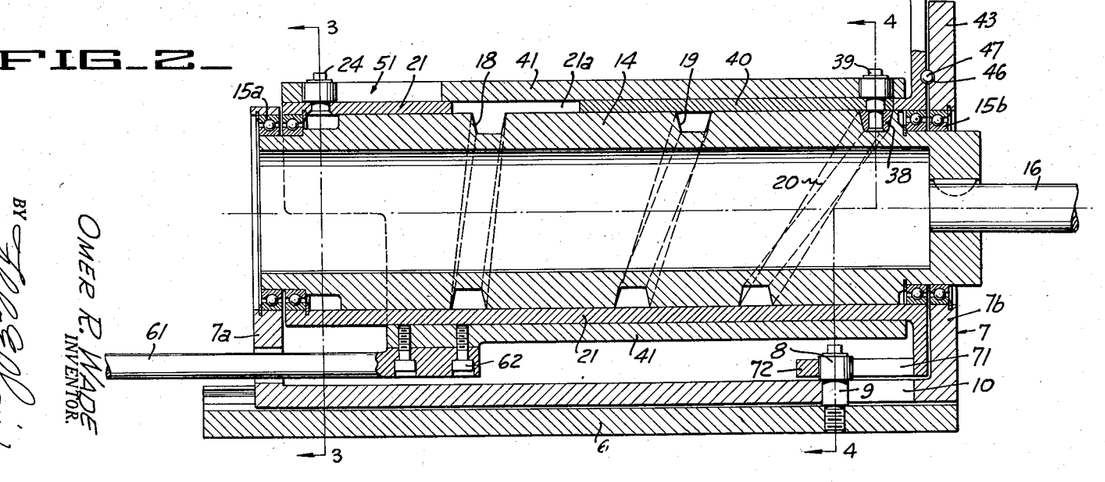
Figure 2 is a sectional view taken along the line 2—2 of Figure 1.
Figures 3, 4:
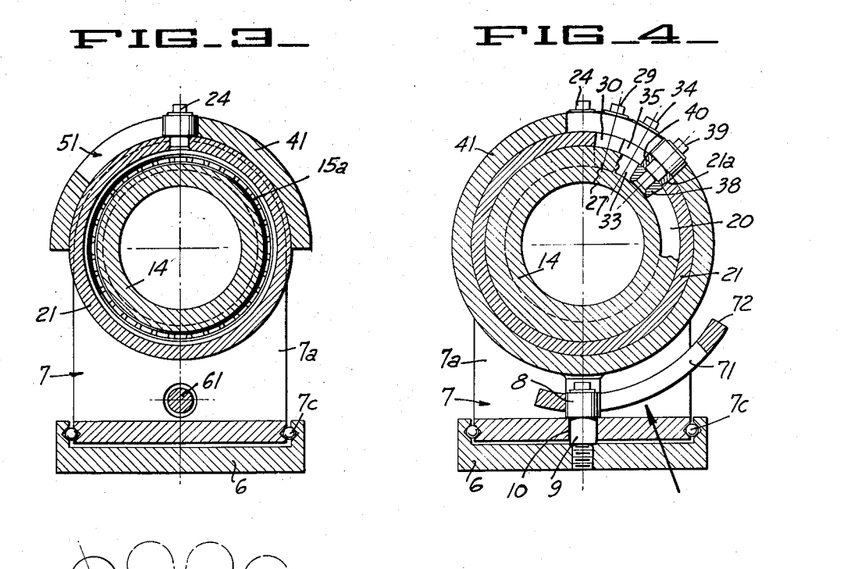
Figure 3 is a sectional view taken along the line 3—3 of Figure 2.
Figure 4 is a sectional view taken along the line 4—4 of Figure 2.

Referring to the drawings, a base 6 supports the cam transmission and provides means for mounting the transmission. As shown particularly in Figures 2, 3 and 4 of the drawings, a cam support frame 7 is mounted on the base 6 for reciprocal movement with respect thereto. The bearings 7c permit longitudinal movement. The compensating cam roller 8 carried on the stud 9, fixed to the base 6, imparts longitudinal movement through the compensating cam to the frame 7. The stud 9 which is fixed to the base 6 passes through an elongated slot 10 formed in the supporting frame 7.

The cam unit 14 is mounted for rotation relative to the cam supporting frame 7 by suitable means, for example, front and rear ball-bearings 15a and 15b carried by the portions 7a and 7b of the frame. The cam unit 14 may contain any desired number of individual cams arranged in spaced relationship and having predetermined contours. The cam unit is suitably coupled to a power means, for example, by a drive shaft 16. The power unit (not shown) may, for example, be a motor which effects the rotation of the cam unit 14.

The cam unit 14 is illustrated with three cams or cam grooves which are separately arranged in spaced relationships and which have been designated by the reference numerals 18, 19 and 20. These cams are differently contoured with respect to one another and are disposed at different angular relationships with respect to the longitudinal axis of the cam unit 14. The contour and angular disposition of each cam can take any desired form and disposition depending upon the action or movement pattern desired in the actuated external member or device Further, although in the drawings, the cam unit 14 contains three cams, it is to be understood that the number of cams employed can be any desired greater or lesser number as may be required to accomplish a desired combination of movements. The cam unit 14 is extendible in length and other dimensions to accommodate any number of cams.

As illustrated, the cam 18 (Figure 2) is in the form of a rectangular groove and in this particular instance runs continuously about and within the periphery of the unit but at approximately an 85° angle displaced from the axis thereof. Similarly, the cam groove 19 is formed continuously about and within the periphery of the cam unit 14 and is formed in the cam unit 14 at approximately a 75° angle displacement from the axis of the unit. The third cam 20 is formed as a groove extending continuously about the cam unit 14 at approximately a 60° angle displacement with respect to the axis.

A cam slide housing, designated generally by the reference numeral 21, is fitted about the unit 14. A stud 24 is secured to the periphery of the slide housing 21 for purposes to be presently described.

A follower means is associated with each of the cams 18, 19 and 20. Thus with reference to cam 18, the follower assembly comprises cam roller 27 carried by the stud 29. The roller is adapted to engage the cam groove 18. The stud 29 is mounted on a slidable member 30 which is carried in the housing 21 for reciprocal movement in a direction parallel to the housing axis.

Another roller 33 engages the cam groove 19 and is carried by the stud 34 which is secured to a slide member 35. Slide member 35 is likewise carried in the housing 21 for reciprocating movement in a direction parallel to the housing axis. A third roller 38 engages the cam groove 20 and is carried by the stud 39, the latter being secured to a slide member 40. Member 40 is similarly carried for reciprocating movement in the housing 21. All of the slide members may be disposed side by side and accommodated in a suitable longitudinal recess or opening 21a provided in the housing 21, whereby they are free to slide longitudinally.

The cam selector member comprises, in the present embodiment of the invention, a cylindrical sleeve 41 which overlies the housing 21. The member 41 may be interlocked with any one of the aforesaid cam follower elements by clockwise and counterclockwise shifting of the underlying member 21. The shifting of housing 21 relative to the sleeve 41 can be effected automatically with power driven means and in synchronism with the movement of the other elements. The housing 21 can also be manually shifted relative to the sleeve 41, as described. For purposes of illustration and explanation, I have shown the housing 21 arranged for manual shifting thereof by the hand lever 42. The lever may be integral with or detachably connected to the unit. The lever may be mounted adjacent the extension 43 of the cam supporting frame 7b. The housing 21 is rotatable with respect to the cam supporting frame 7 whereby the housing 21 may be moved from one position to another, clockwise or counterclockwise, relative to sleeve 41.

Suitable detent means may be employed to effect predetermined selective positioning of the housing 21 relative to the selector sleeve 41, as for example, a ball detent 47 which is engageable in any one of a plurality of recesses 46 in the frame extension 43. As hereinafter explained, the positions of lever 42 are so arranged that on each shifting of the housing 21 there will result a locking of the selector sleeve 41 with a selected cam follower and simultaneous release of the remaining cam followers of the cam roll assembly.

The cam selector means 41 is formed with a plurality of specially cut notches therein to the end that any selected one of the cam followers can be locked to the selector member 41. The number of notches in the selector sleeve correspond with the number of cams, plus one, that are in the cam unit 14. The additional notch designated by the reference numeral 51 is formed in sleeve 41 to afford an interlock with the outer head of stud 24 to hold the sleeve 41 in a rest or neutral position.

The notches of the selector sleeve 41 are designated generally by the reference numerals 51, 52, 53 and 54. Each of these notches is so formed in the sleeve that each contains a relatively narrow portion, designated by the reference numerals 51a, 52a, 53a and 54a, respectively, wherein the head of the studs 24, 29, 34 and 39 are adapted to be seated for the interlocking of the cam selector member 41 either with stud 24 for neutral position, or any one of the other studs for a predetermined reciprocal movement. The narrow portions of the notches 51 to 54 are spaced apart circumferentially of the sleeve with respect to one another. Thus, when the housing 21 is rotated relative to the selector sleeve 41, first one and then another of the cam followers is interlocked with the sleeve 41. The housing 21 can be shifted or rotated to any desired extent or through any desired arc in a single throw thereof. Moreover, the shifting of cam unit 21 is not restricted in the sense that it can only be moved serially so as to effect an interlocking of the sleeve 41 with successively arranged cam followers. The movement can, for example, be such that the sleeve 41 is first interlocked with stud 29 and then a shift made which will interlock with cam stud 39, or to any intermediate position at the will of the operator. The shifting of the housing 21 from one position to another relative to the sleeve 41 is preferably accomplished most effectively when the cam followers are in the "dwell" position as hereinafter to be explained.

Each of the notches 51 through 54 inclusive of the selector sleeve 41 are so formed that the studs 24, 29, 34 and 39, except the particular stud which has been selected and which is interlocked with the sleeve, will be free to reciprocate constantly during the movement of the unit 14. Thus, each of the notches 51 through 54 inclusive is formed with variable boundaries so that in addition to the restricted boundaries of each notch that defines the aforesaid narrow portions 51a, 52a, 53a and 54a, there are defined in the sleeve other notch portions of variable width. For example, notch 51 is formed with its narrow portion 51a adjacent to the side 51b of the notch, and with progressively wider portions toward the side 51c. The notch 52 is formed with its narrow portions 52a one step away from the side 52b of such notch and with progressively wider portions toward the side 52c. The notch 52 also has a wide portion also adjacent to the side 52b thereof. The notch 53 is formed complementary to the notch 52 in that the wider portions of the notch are adjacent to the side 53b. A wide portion is also provided adjacent to the side 53c. The narrower portion 53a is intermediate the wider portions. Finally, the notch 54 is formed complementary to the notch 51 in that its narrower portion 54a is on the far side 54c and its progressively wider portions are on the side 54b. The contour of the notches of sleeve 41 permit free reciprocating movement of all cam followers and studs except the one selected to be interlocked with the sleeve 21.

Each of the unlocked slides reaches the limit of its movement in one direction simultaneously with the other slides. The limits of movement of the cam followers are herein referred to as the "dwell" positions of the cam follower elements. In the "dwell" positions the relative shifting between housing 21 and selector 41 can be most effectively accomplished.

The motion imparted to the cam selector sleeve 41 by virture of the interlocking thereof with any selected one of the plurality of the cam operated studs, is transmitted to an external device by means of linkage 61 which is suitably secured to the periphery of the cam selector sleeve 41, as for example, by means of screw-bolts 62 or other fasteners.

It will be clear from the foregoing description that the linkage 61 is given a reciprocating motion by virtue of the reciprocating action imparted to the selector member 41 by the selected cam. The pattern of such reciprocating action can be varied in accordance with the contouring of the cams. The linkage can be brought to a dead stop, or to a neutral position, when the housing 21 is shifted to effect an interlock between stud 24 and sleeve 41. When the linkage 61 is in the neutral position the multiple cam unit 14 is still rotating. It is to be understood that the same result could be achieved by providing a cam which is contoured to impart no reciprocating motion to the selector sleeve 41.

In certain applications, it is desirable to provide a mechanical scanner which can cause the radar beam to scan complex patterns. For example, a conical scan may be employed in which the angular diameter of the circle described by the beam is continuously varied from zero degrees to a maximum of 60° or more and back to zero. In this manner a solid angle is scanned completely in a matter of seconds as the beam spirals outwardly and inwardly. In other applications it may be desirable to scan horizontally or to combine horizontal scan with vertical tilt whereby objects may be viewed which are above or below the horizon.

Figures 7, 10:
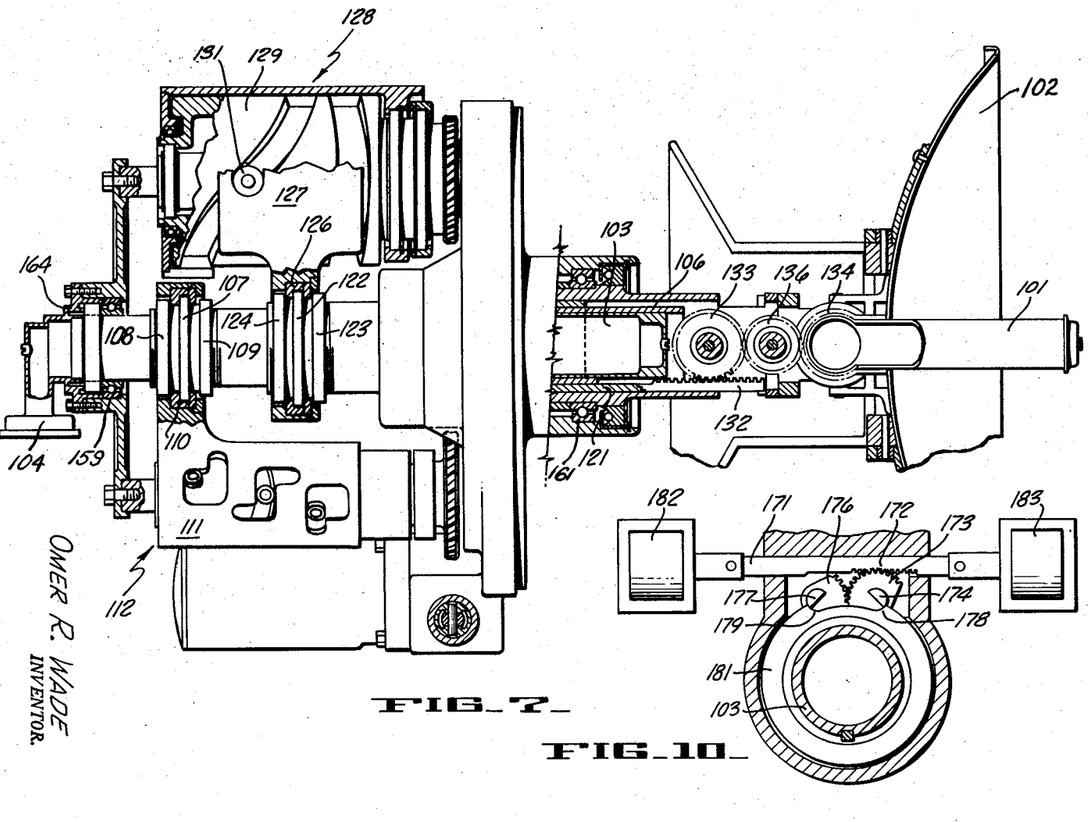
Figure 7 is a plan view partly in section of a scanner constructed in accordance with my invention.
Figure 10 is an elevational view of the nod axis erecting mechanism.

A complex scanner which may be employed is shown in Figures 7, 8, 9 and 10. Referring to Figure 7, an antenna feed 101 extends through the reflector 102. The antenna feed is connected through suitable rotary coupling joints to the circular waveguide 103 which extends through the scanning mechanism and terminates in a waveguide coupling 104.

A sleeve 106 is adapted to fit over the waveguide 103. One end of the sleeve 106 is provided with an annular ring 107 suitably connected thereto. For example, the ring shown is attached by means of the threaded rings 108 and 109. The annular ring 107 is engaged by an annular grooved ring 110. The ring 110 is secured to the selector sleeve 111 of the tilt transmission 112. The transmission 112 is of the type previously described. Thus, as the cam transmission is rotated, a reciprocating motion is applied to the selector sleeve 111 which in turn is transmitted through the rings 107 and 110 to the sleeve 106.

Figure 8:
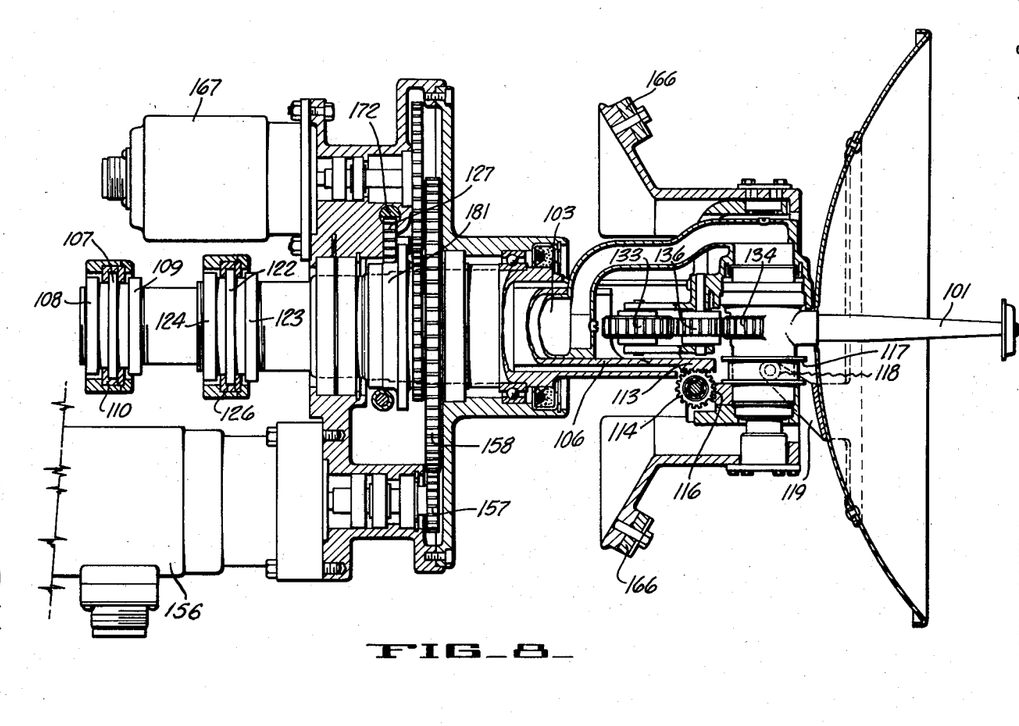
Figure 8 is a side elevational view partly in section of the apparatus of Figure 7.

Referring to Figure 8, the other end of the sleeve 106 is provided with a rack 113 which engages the gear 114. A second rack 116 also engages the gear 114. Thus, as the sleeve 106 is reciprocated, the rack 116 is moved an equal distance but at 90° relative thereto. The rack 116 is attached to the track way 117 which engages the roll 118. The roll 118 is secured to the radar reflector tilt frame 119. As the tilt cam 112 reciprocates the sleeve 106, the antenna is caused to tilt through an angle which corresponds to the movement of the sleeve. Suitable rotating waveguide joints (not shown) maintain an R.-F. connection to the antenna as it is tilted.

Referring to Figure 7, a second sleeve 121 is slidably fitted over the sleeve 106. The sleeve 121 is provided at one end with a ring 122 which may be secured to the sleeve by means of threaded rings 123 and 124. A suitable grooved ring 126 engages the ring 122. The ring 126 is attached to the selector sleeve 127 of the cam transmission 128. The cam transmission 128 is also of the type previously described. Thus, as the cam 129 is rotated, a reciprocating motion is transmitted by the roller 131 to the selector sleeve 127. The other end 132 of the sleeve 121 is provided with a rack which engages gear 133. The gear 133 drives the antenna gear 134 through the idler gear 136. Thus, as the sleeve 121 reciprocates longitudinally, the antenna feed and reflector are nodded. The amount of nodding of the antenna is dependent upon the shape of the cam grooves on the cam cylinder 129. Again, suitable rotary joints provide an R.-F. connection between the antenna feed 101 and the waveguide 103.

The motor 141 (Figure 9) supplies the power to the cam transmissions 112 and 128. The motor drives a worm gear 142 which engages the gear 143 to rotate shaft 144. The shaft 144 is provided with worm gears 146 and 148 which drive the cam sleeves through the gears 149 and 151 respectively. One end of the shaft 144 is provided with a crank 152 which actuates the waveguide pump 153.

As is well known, to obtain a spiral scan it is necessary to spin the antenna as it is nodded. Thus, the spin driven motor 156 spins the antenna through the gears 157 and 158. When the spin motor is spinning the antenna, the circular waveguide 103, the sleeves 106 and 121, and the associates joints are spun. Suitable ball bearings 159, 161, 162 and 163 are provided to reduce friction. The waveguide flange 104 associated with the waveguide 103 is connected thereto by a suitable choke joint 164, whereby the flange is stationary as the antenna is spun. The lugs 166 provide suitable means for balancing the antenna as it is spun.

The data take-offs are a spin generator 167 for the spin angle, and potentiometers 168 and 169 for the tilt and nod angles, respectively.

In order to effect a horizontal scan, it is necessary to lock the antenna against rotation with the nod axis vertical. Then as the nod transmission is shifted into engagement with a cam, the antenna scans horizontally, i. e., the antenna is wig-wagged in a horizontal line.

Referring particularly to Figures 8 and 10, a nod axis erecting mechanism is illustrated. The mechanism comprises a shaft 171 which has a rack 172 formed thereon. The rack 172 engages the partial gear 173 which rotates the lock pin 174. A second gear 176, engages the gear 173 and serves to rotate the lock pin 177. The pins 174 and 177 engage the shoulders 178 and 179 respectively which are formed on the annular member 181 which is keyed to the circular waveguide 103 and rotates therewith. The shoulders 177 and 178 are spaced so that when the locking pins 174 and 177 engage the shoulders, there is no rotational movement of the antenna. The shoulders are suitably located so that when the annular member 181 is locked, the nod axis is in a vertical position.

A pair of solenoids 182 and 183 have their cores attached to opposite ends of the rod 171. Thus, by energizing the solenoid 183, the rack rotates the gear 173 to thereby move the locking pins into locking engagement with the shoulders. Upon energizing the solenoid 182, the annular member is unlocked, thereby permitting the antenna to spin. Appropriate means (not shown) are provided whereby the solenoid 183 cannot be energized until the spin velocity is sufficiently reduced.

Operation of the mechanical scanner is as follows: For purposes of simplicity, assuming first that the tilt cam is engaged in a cam groove which does not impart any reciprocating motion to the sleeve 106, then by shifting the cam transmission 128 into engagement with a predetermined cam, it is possible to nod the antenna feed and reflector through any desired angle. Further, by properly contouring the cam, the nod pattern may be varied as desired. As the antenna is spun and nodded it will scan through a cone. Since by contouring the cam the rate of nod can be either constant or varying, or can be constant in some sections and accelerated or decelerated in others, it is possible to obtain maximum target detection probability.

As previously described, shifting the cam transmission 128 into engagement with a predetermined cam nods the antenna. If the nod axis is locked in an erected position, the antenna wig-wags to scan horizontally. The contouring of the cam controls the rate of nod, or wig-wag, so that it may be constant or varying, or can be constant in some sections and accelerated or decelerated in others. If it is desired to scan above and below the horizon, the tilt cam is engaged to impart a motion which causes the antenna to tilt above and below the horizon.

Figures 9, 11:
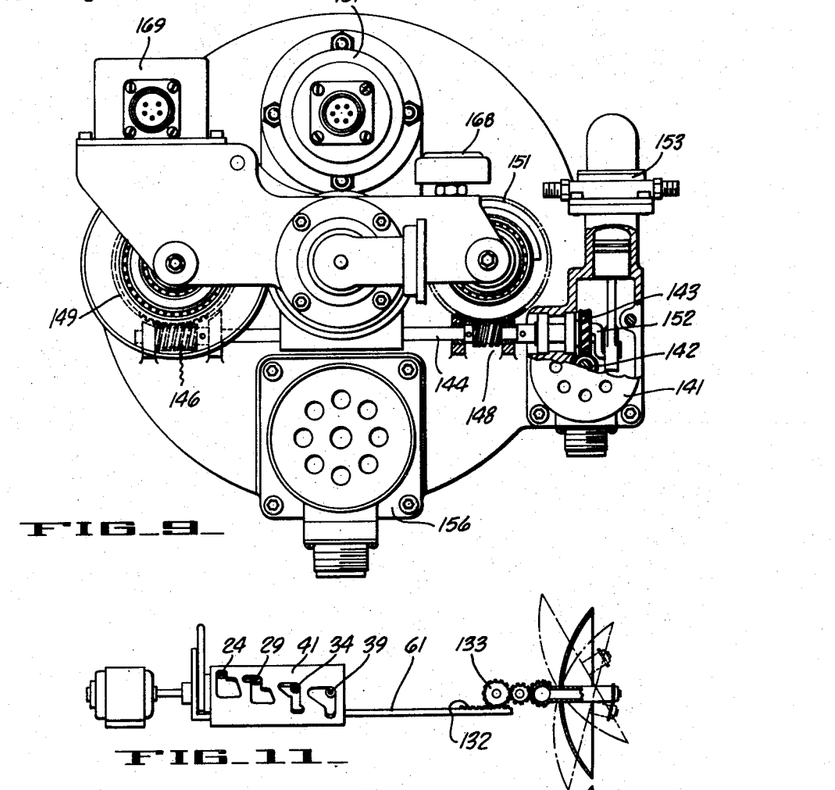
Figure 9 is an end view of the apparatus of Figure 7.
Figure 11 is a schematic view partly in section of a horizontal scanner which incorporates my invention.

In Figure 11, I have shown a cam transmission of the type previously described (Figures 1, 2, 3, 4 and 5) having its linkage 61 attached to the gear rack of the antenna. The gear 201 engages the rack 202. Thus, as the member 61 reciprocates, the gear 201 is rotated through a corresponding angle. This causes the antenna to scan as shown by the dotted lines. By properly cutting the cam, the antenna may be made to scan over any predetermined angle. Thus by shifting the housing 21 to effect an interlock of any one of the studs 24, 29, 34 or 39 with the sleeve 41, it is possible to impart various nod angles to the antenna. For example, if the stud 24 engages the sleeve 41, the antenna remains in its zero position as the cam is rotated. By shifting the housing 21 to interlock the other studs 29, 34 and 39, it is possible to impart any desired motion to the antenna.

I have provided in the improved selective cam transmission means for equalizing the rise and fall of the cam unit 14 relative to the nod rack. In this manner the nod rack and gear of the radar equipment assume the same position at the same instant for zero nod angle.

Figures 5, 6:
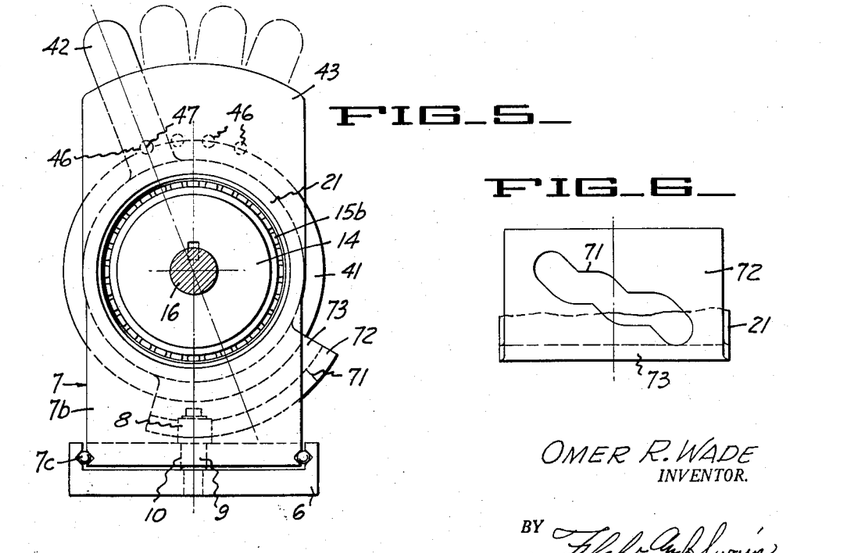
Figure 5 is an end elevational view with full and dotted lines showing the various positions of the shift lever of the invention.
Figure 6 is a view of the compensating cam arrangement, this view being a bottom view of the embodiment shown in Figure 1 looking in the direction of the arrow of Figure 4.

The equalizing cam, designated by the reference numeral 71, shown in Figure 6 of the drawings, may be employed to bring the antenna to zero nod angle at the same position for all the cams. This cam may be formed in a projecting arcuate segment 72 provided on the portion 73 of the cam roll slide housing 21. The cam receives the cam roll 8, revolving on stud 9, which is fixed to the base 10. The frame 7 is therefore caused to slide longitudinally relative to the base 6 on the bearings 7c by action of the equalizing or compensating cam 71. In the embodiment shown, the cam acts automatically as the transmission is shifted from one cam to another.

The function of the equalizing cam may be stated as follows: Assuming that cam 18 of the cam unit 14 has a total rise and fall (i. e. throw) of one inch, and that the cam selector sleeve is locked with the cam roller which is associated with the cam 18 to pick up the motion of the roller. Assuming further that in this position the sleeve traverses one inch in its reciprocation. The cam selector sleeve 41 actuates the gear 133 of the antenna through the linkage 61. If these gears are selected and arranged to move the antenna 30° for each inch of rack movement, i. e., 30° forward and 30° backward, then the scanning of the beam will have a wig-wag motion 15° on each side of the nod or zero angle. In other words, point zero of the wig-wag will be exactly one-half of the cam rise.

If we assume that the cam 19 of the cam unit 14 has a two inch rise and fall, then with the selector sleeve 41 locked to the associated cam follower, the beam will be scanned through 60°. In this instance it will be necessary to move the rack of the radar equipment back one-half inch in order that the wig-wag motion of the scanning device of the radar equipment be 30° equally on each side of the zero nod angle established when utilizing cam 18. The zero nod angle of the radar equipment being always a half-way point of any included nod angle, it is clear that the instant of zero on the cam selected is always one-half of the rise and fall of the cam. The equalizing or compensating cam 71 takes care of variances in the contours of the multiple cam unit to maintain the wig-wag motion of the scanning device of the radar equipment at the desired oscillating total movement.

Figure 12:
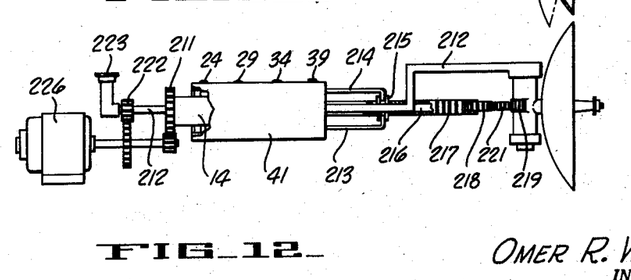
Figure 12 is a schematic view partly in section of a spiral scanner which incorporates my invention.

Referring to Figure 12, a spiral scanner which employs a selective cam transmission of the type previously described is shown. The cam sleeve attached to the gear 211 is adapted to rotate at a predetermined speed, for example, 30 r. p. m. A circular waveguide 212 passes concentric with the cam sleeve and is connected to the antenna by suitable rotary joints (not shown) for transmission of R.-F. energy. The selector sleeve 41 has members 213 and 214 attached to the collar 215. The collar 215 is associated with the rack sleeve 216 which is provided with a rack 217 at the other end. The rack 217 engages the gear 218 which drives the gear 219 through the idler gear 221. The gear 219 is attached to the antenna whereby as the rack 217 is reciprocated, the antenna is caused to nod. The nod corresponds to the particular cam which is selected by the cam selector on the cam transmission unit.

A stationary waveguide flange 223 is provided at the other end of the waveguide 212 and is connected thereto through a suitable rotary joint. Suitable motive means, for example, motor 226, drives the waveguide and the cam sleeve through gears. Rotation of the waveguide 212 causes the antenna to spin. Thus, the antenna spins as the cam transmission nods it thereby giving rise to a spiral scan.

As before (in Figure 1), the contour of the cams may have any predetermined contour to give the desired emphasis in scanning. The equipment is also provided with an associated roller and stud 24 which, when engaged, allows the cam sleeve to rotate without imparting a nodding motion to the antenna through the selector sleeve 41.

Thus, it is seen that I have provided a mechanical scanner and cam transmission therefor in which the rate of nod can be either constant or varying or it may be constant in some sections and accelerated in others. This permits maximum target detection probability. The scan path may be concentrated in one position and lightened in others, permitting the localization and study of target in particular areas. Also, when tactical information as to logical approach and angle of enemy intercepters becomes known, the scan path may be so designed that these areas can be intensely covered. All of these variations may be easily achieved by properly contouring the cams in the cam transmission. Further, by providing the various cams with different contours, it is possible to provide a predetermined number of scanning actions which may then be selected by an operator to give the type of scanning required for a particular tactical situation.

This application is a continuation-in-part of the application entitled "Selective Cam Transmission," Serial No. 300,009, filed July 21, 1952, now abandoned.

I claim:

1. A mechanical scanner for scanning an electromagnetic beam, comprising an antenna serving to project said beam, cam transmission means comprising a rotatable cylindrical cam unit having a plurality of cam paths formed on its periphery at spaced intervals throughout its length, all of said cam paths being of different contour, a cam follower engaging each of said cam paths, a member adapted to be reciprocated, and selectively operable means for interlocking said member with any one of said cam followers, means serving to interconnect said reciprocating member with said antenna whereby the antenna is nodded to thereby scan the beam in accordance with the contour of the selected cam path.

2. Apparatus as in claim 1 wherein one of said cam paths is contoured whereby the cylindrical cam unit may be rotated without nodding the said antenna.

3. A mechanical scanner for scanning an electromagnetic beam, comprising an antenna serving to project said beam, waveguide means serving to transmit energy to said antenna, cam transmission means comprising a rotatable cylindrical cam unit having a plurality of cam paths formed on its periphery at spaced intervals throughout its length, all of said cam paths being of predetermined contour, a cam follower engaging each of said cam paths, a member adapted to be reciprocated, selectively operable means for interlocking said member with any selected one of said followers, a sleeve slidably surrounding said waveguide and engaging said reciprocating member whereby said sleeve is caused to reciprocate, means connecting said sleeve to said antenna whereby the said antenna is nodded in accordance with the selected cam, and means for spinning said antenna whereby the antenna beam is caused to spirally scan a cone in accordance with the selected cam.

4. Apparatus as in claim 3 wherein one of said cam paths is contoured whereby the cylindrical cam unit may be rotated without nodding the said antenna.

5. A cam transmission comprising a cylindrical rotatable unit having at least one continuous cam path formed on its periphery, a follower engaged in said cam path, means for restraining the follower for reciprocating movement longitudinally of the axis of the unit responsive to rotation of the cylindrical unit, a member mounted for reciprocation in a direction parallel to the movement of the follower, and selectively operable means for releasably locking said member to the cam follower.

6. In a cam transmission, a cylindrical rotatable unit having at least one continuous cam path formed in its periphery, a follower engaged in said cam path, means carrying the follower for reciprocating movement longitudinally of the axis of the unit and for restraining said follower from rotation, a cylindrical member disposed about said unit and said follower and mounted for reciprocation in a direction parallel to the movement of the follower, said last member being shiftable to at least two operating positions about the axis of the unit, and selectively operable means carried by said member for releasably locking the same to the cam follower for one of said operating positions whereby said member reciprocates with the cam follower, and for said other operating position permitting free reciprocation of said follower without corresponding reciprocation of said member.

7. In a cam transmission, a cylindrical rotatable unit having at least one continuous cam path formed about its periphery, a follower engaged with said cam path, means slidably guiding the follower for reciprocating movement parallel to the axis of the unit and for restraining the follower against rotation, a cylindrical member disposed about said unit and said follower and mounted for reciprocation in a direction parallel to the movement of the follower, means for shifting said sleeve member about its axis between at least two operating positions, and means comprising a notch formed in the sleeve member adapted to form an interlock between said sleeve member and the follower for one operating position of the sleeve member, said notch permitting freedom of movement of said follower for said other operating position of the sleeve member, and a motion transmitting member connected to said sleeve member for application of reciprocating motion.

8. In a selective cam transmission, a rotatable cam unit containing at least two cam paths of different contours, a cam follower engaging each of said cam paths, and a member embracing said multiple cam unit and cam follower; said member having means to enable the selective interlocking of said member with any selected one of said cam followers whereby movement of said member is determined by the movement of the cam follower with which it is interlocked.

9. In a selective cam transmission, a rotatable cam unit containing at least two cam paths of different contours, a cam follower engaging each of said cam surfaces, a member overlying said multiple cam unit; said member having a plurality of notches therein, and means for relatively shifting said cam followers and said notches whereby one of said cam followers is selectively interlocked with said member and said member is moved in accordance with the cam surface with which said interlocked cam follower is associated.

10. In a selective cam transmission, a rotatable cam unit, said unit having at least two cam paths of different contours on its periphery, a plurality of cam followers each engaging one of said cam surfaces, means serving to carry said followers for reciprocating movements, a housing surrounding the unit and said followers, said housing having a plurality of notches therein, and means for relatively shifting said followers and said housing for selecting any one of said cam followers for interlocking with said housing through the medium of one of said notches whereby said member moves in accordance with the cam surface with which said interlocked cam follower is associated.

11. In a selective cam transmission, a rotatable cylindrical cam unit, said unit having a plurality of cam paths therein all of different contours, cam followers engaging each of said cam surfaces, means serving to carry the followers for reciprocating movements, a cylindrical sleeve overlying said cam unit, and means for selectively interlocking said sleeve with said cam followers individually whereby motion of an interlocked cam follower will be transmitted to said sleeve.

12. In a selective cam transmission, a rotatable multiple cam unit having a plurality of cam paths of different contours, a sleeve overlying said cam unit, a plurality of cam followers, one engaging each cam path, means serving to carry the followers for reciprocaitng movements, and means for interlocking said sleeve with any selected one of said cam followers to effect the transmission of the motion of the interlocked cam follower to said sleeve.

13. A selective cam transmission as defined in claim 12 in which said last means comprises means for shifting the relative positions of the followers with said sleeve and independent of rotation of the cam unit.

14. In a selective cam transmission, a rotatable cylindrical cam unit having a plurality of cam paths formed in its periphery at spaced intervals throughout its length, all of said cam paths being of different contour, a cam follower engaging each cam path, a member adapted to be reciprocated, and selectively operable means for interlocking said member with any selected one of said followers.

15. In a selective cam transmission, a base, a frame mounted on the base for reciprocal movement, a cylindrical cam unit rotatably mounted on said frame for movement relative thereto, a plurality of cam paths on said unit all of different contour, a cylindrical housing overlying said cam unit, a plurality of cam followers within said housing; said cam followers being arranged to engage said cam surfaces, means serving to carry said followers for reciprocating movement in a direction parallel to the axis of the unit, a cylindrical cam selector surrounding said housing; said selector member having a plurality of notches therein through which said cam followers extend and being movable relative to said housing, means for turning said housing relative to said selector member to effect an interlock between any selected one of said plurality of cam followers and said selector member through the medium of one of said notches whereby the reciprocating motion of a cam surface will be transmitted to said member, a compensating cam depending from said housing, a cam engaging element supported on said base and engaging with said compensating cam, thereby to effect longitudinal movement of said cam supporting frame relative to said base simultaneously with turning the housing to select a cam follower.

16. A selective cam transmission as defined in claim 15, together with means for positioning the housing to disengage all the followers with respect to the selector, 17. A mechanical scanner for scanning an electromagnetic beam, comprising an antenna serving to project said beam, cam transmission means comprising a rotatable cylindrical cam unit having at least one continuous cam path formed in its periphery, a cam follower engaging said cam path, means carrying the follower for a reciprocating movement longitudinally of the axis of the cylinder and for restraining said follower from rotation, a member adapted to be reciprocated, selectively operable means for interlocking said member with said cam follower, means serving to interconnect said reciprocating member with said antenna whereby the antenna is moved to thereby scan the beam in accordance with the contour of the cam path.

18. A mechanical scanner for scanning an electromagnetic beam comprising an antenna serving to project the beam, wave guide means serving to transmit energy to said antenna, first and second sleeves, said first sleeve slidably associated with said wave guide, said second sleeve slidably associated with said first sleeve, first and second cam transmission means, each of said cam transmission means comprising a rotatable cylindrical cam unit having at least one continuous cam path formed in its periphery, a cam follower engaging said cam path, a member adapted to be reciprocated, selectively operable means for interlocking said member with said cam follower, means serving to interconnect the reciprocating member of the first cam transmission with the first sleeve, and means serving to engage the reciprocating member of the second cam transmission with the second sleeve, whereby said sleeves are reciprocated by said cam transmission, and means serving to engage said first and second sleeves with said antenna whereby said first sleeve causes the antenna to nod and said second sleeve causes the antenna to tilt to thereby wigwag the antenna horizontally and tilt the same to scan above and below the horizon.

19. A mechanical scanner for scanning an electromagnetic beam comprising an antenna serving to project said beam, wave guide means serving to transmit energy to said antenna, first and second sleeves, said first sleeve slidably associated with the wave guide, said second sleeve slidably associated with said first sleeve, first and second cam transmission means, each of said cam transmission means comprising a rotatable cylindrical cam unit having a plurality of cam paths formed on its periphery at spaced intervals throughout its length, all of said cam paths being of different contour, a cam follower engaging each of said cam paths, a member adapted to be reciprocated, selectively operable means for interlocking said member with one of the followers, means for connecting the reciprocating member associated with said first cam transmission to said first sleeve, means for connecting the reciprocating member associated with said second cam transmission to said second sleeve, and means for attaching said sleeves to said antenna whereby the same nods and tilts in accordance with the contour of the selected cam.

References Cited in the file of this patent
UNITED STATES PATENTS

| | | |
|---|---|---|
| 1,351,753 | Hover | Sept. 7, 1920 |
| 2,493,420 | Ranney et al. | Jan. 3, 1950 |
| 2,543,188 | Moseley | Feb. 27, 1951 |
| 2,678,394 | Curtis | May 11, 1954 |
| 2,679,165 | Montgomery | May 25, 1954 |